United States Patent [19]

Higgins

[11] Patent Number: 4,600,742

[45] Date of Patent: Jul. 15, 1986

[54] POLYCARBONATE COMPOSITIONS

[75] Inventor: William A. Higgins, Gates Mills, Ohio

[73] Assignee: The Lubrizol Corporation, Wickliffe, Ohio

[21] Appl. No.: 641,892

[22] Filed: Aug. 17, 1984

[51] Int. Cl.$^4$ ............................................. C08K 5/42
[52] U.S. Cl. ....................................................... 524/166
[58] Field of Search .......................... 524/166; 525/462

[56] References Cited

U.S. PATENT DOCUMENTS

| | | | |
|---|---|---|---|
| 3,917,559 | 11/1975 | Mark | 260/45.7 S |
| 3,919,167 | 11/1975 | Mark | 260/45.8 N |
| 3,926,908 | 12/1975 | Mark | 260/45.7 S |
| 3,931,100 | 1/1976 | Mark | 260/45.7 S |
| 3,933,734 | 1/1976 | Mark et al. | 260/45.7 S |
| 3,940,366 | 2/1976 | Mark | 260/45.9 R |
| 3,948,851 | 4/1976 | Mark | 260/45.8 RW |
| 3,951,910 | 4/1976 | Mark | 260/45.9 NC |
| 3,953,396 | 4/1976 | Mark | 260/45.8 A |
| 3,953,399 | 4/1976 | Mark | 260/45.85 H |
| 3,971,756 | 7/1976 | Bialous et al. | 260/45.7 R |
| 3,978,024 | 8/1976 | Mark | 260/45.85 T |
| 4,007,155 | 2/1977 | Mark | 260/45.7 S |
| 4,028,297 | 6/1977 | Webb | 260/37 PC |
| 4,064,101 | 12/1977 | Mark | 260/45.85 H |
| 4,066,618 | 1/1978 | Mark | 260/45.85 T |
| 4,067,846 | 1/1978 | Mark | 260/45.9 KA |
| 4,069,201 | 1/1978 | Mark | 260/45.95 R |
| 4,073,768 | 2/1978 | Mark | 260/45.7 S |
| 4,075,164 | 2/1978 | Mark | 260/45.7 S |
| 4,092,291 | 5/1978 | Mark | 260/45.7 S |
| 4,093,589 | 6/1978 | Factor et al. | 260/45.75 B |
| 4,093,590 | 6/1978 | Mark | 260/45.85 S |
| 4,100,130 | 7/1978 | Freitag et al. | 260/37 PC |
| 4,104,245 | 8/1978 | Mark | 260/45.7 S |
| 4,104,246 | 8/1978 | Mark | 260/45.7 S |
| 4,104,253 | 8/1978 | Mark | 260/45.8 RW |
| 4,110,299 | 8/1978 | Mark | 260/37 PC |
| 4,110,307 | 8/1978 | Mark | 260/45.9 KA |
| 4,111,977 | 9/1978 | Mark | 260/45.95 R |
| 4,113,692 | 9/1978 | Wambach | 260/40 R |
| 4,113,695 | 9/1978 | Mark | 260/45.8 N |
| 4,115,354 | 9/1978 | Mark et al. | 260/45.7 S |
| 4,153,595 | 5/1979 | Mark | 260/45.7 S |
| 4,178,281 | 12/1979 | Horn et al. | 260/45.8 R |
| 4,197,232 | 4/1980 | Bialous et al. | 260/37 PC |
| 4,201,832 | 5/1980 | Hall et al. | 428/412 |
| 4,209,427 | 6/1980 | Williams | 260/17.5 |
| 4,220,583 | 9/1980 | Mark | 260/45.7 S |
| 4,223,100 | 9/1980 | Reinert | 525/146 |
| 4,231,920 | 11/1980 | Mark et al. | 260/45.7 S |
| 4,260,537 | 4/1981 | Limbert | 260/45.85 B |
| 4,263,201 | 4/1981 | Mark et al. | 260/45.7 S |
| 4,290,934 | 9/1981 | Mark et al. | 260/30.8 R |
| 4,303,575 | 12/1981 | Reinert | 260/45.8 A |
| 4,349,658 | 9/1982 | Mark et al. | 528/176 |
| 4,366,279 | 12/1982 | Tomioka et al. | 524/289 |
| 4,367,186 | 1/1983 | Adelmann et al. | 264/22 |
| 4,371,650 | 2/1983 | Rosenquist et al. | 524/162 |
| 4,379,910 | 4/1983 | Mark et al. | 528/202 |
| 4,391,935 | 7/1983 | Bialous et al. | 524/82 |

*Primary Examiner*—Veronica P. Hoke
*Attorney, Agent, or Firm*—James L. Cordek; Denis A. Polyn; Joseph P. Fischer

[57] ABSTRACT

Carbonate polymer compositions are described which comprise a mixture of
(A) an organic carbonate polymer, and
(B) a minor amount of at least one metal sulfonate which is compatible with the carbonate polymer and which sulfonates are characterized by the formula

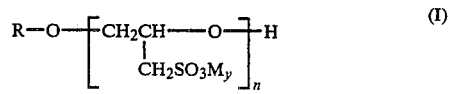

wherein
R is an aliphatic group,
M is an alkali or alkaline earth metal,
n is at least 1, and
y is equal to 1 when M is an alkali metal and ½ when M is an alkaline earth metal.

The carbonate polymer compositions of the invention have improved properties such as, for example, flame-retardancy. Processes for improving the processability and flame-retardancy characteristics of carbonate polymer compositions also are described.

21 Claims, No Drawings

POLYCARBONATE COMPOSITIONS

BACKGROUND OF THE INVENTION

This invention relates to polycarbonate compositions, and more particularly, to polycarbonate compositions having improved properties such as, for example flame-retardancy.

Polycarbonates derived from reactions of organic dihydroxy compounds and carbonic acid derivatives have found extensive commercial application because of their excellent mechanical and physical properties. Polycarbonates are thermoplastic polymers which are particularly suited for the manufacture of molded products where impact strength, rigidity, toughness, thermo and dimensional stability as well as excellent electrical properties are required. The chemistry, synthesis, properties and applications of polycarbonates are discussed in *Chemistry and Physics of Polycarbonates* by Schnell, Interscience, 1964, and *Polycarbonates* by Christopher and Fox, Reinhold Publishing, 1962.

Although used extensively in commercial applications, polycarbonates generally are difficult to fabricate from melts, and polycarbonate products exhibit undesirable flammability characteristics if not treated with the proper additives.

Polycarbonates are difficult to fabricate from melts because the melts generally have exceptionally high viscosities. Attempts have been made to overcome this difficulty by the incorporation of materials known to reduce the viscosity of other resins. Some standard viscosity control agents appear to have little or no effect on the viscosity of polycarbonates. Other compounds known to lower the viscosity of other resins cause degradation of the polycarbonate resins, while still other compounds, conventionally employed to improve the workability of polymers, produce an embrittling effect on polycarbonates when they are mixed with the carbonate and the resin is subjected to elevated temperatures as in molding. Other materials, while satisfactory modifying agents for other plastics, are too volatile to be incorporated in polycarbonates which have much higher melting points than many other thermoplastics.

In order to improve the flammability resistance of polycarbonates, various approaches have been pursued including the incorporation of various additives which have been reported to improve the flame-retardant characteristics of polycarbonates treated therewith. Many patents have issued suggesting useful flame-retardant additives for polycarbonates, including, for example, U.S. Pat. Nos. 3,940,366; 3,948,851; 3,978,024; 3,953,396; 3,909,490; 3,919,167; 3,926,908; 3,931,100; 3,951,910; 4,028,297; and 4,231,920. A large number of such prior art patents are discussed in U.S. Pat. No. 4,231,920, particularly those prior art suggestions involving the use of organic alkali metal and organic alkaline earth metal salts or mixture thereof. Among the metal salts which have been suggested as being useful as flame-retardant additives for polycarbonates are the monomeric and polymeric aromatic sulfonic acids; heterocyclic sulfonic acids, monomeric or polymeric aromatic ether sulfonic acids, monomeric or polymeric phenol ester sulfonic acids, monomeric or polymeric aromatic amide sulfonic acids, etc.

U.S. Pat. No. 4,263,201 describes flame-retardant compositions comprising mixtures of aromatic carbonate polymer and minor amounts of an organic sulfonate or carboxylate, and halogenated compound. The sulfonates may be alkyl sulfonates having one to 18 carbon atoms in the alkyl group or aryl sulfonates containing 6 to 10 carbon atoms, both of which may contain halogen substituents. U.S. Pat. No. 4,007,155 also describes the use of metal salts of aliphatic sulfonic acids as flame-retardant additives for polycarbonates. The aliphatic group may contain electron-withdrawing substituents such as halo, nitro, terhalomethyl and cyano groups.

SUMMARY OF THE INVENTION

It now has been found that the workability and flame-retardant characteristics of polycarbonates, including polycarbonate blends, and in particular, aromatic carbonate polymers, can be improved by incorporating into the polymer, a minor amount of at least one metal sulfonate which is compatible with the carbonate polymer and which sulfonates are characterized by the formula

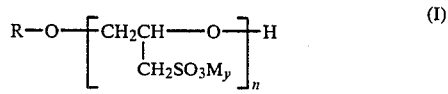

wherein
R is an aliphatic group,
M is an alkali or alkaline earth metal,
n is at least 1, and
y is equal to 1 when M is an alkali metal and ½ when M is an alkaline earth metal.

Generally, the amount of sulfonate incorporated into the carbonate polymer composition will be an amount which is effective to improve the workability of the polymer melt and/or the flame-retardant properties of the carbonate polymers. This amount generally will be up to about 10% by weight based on the weight of the carbonate polymer.

DESCRIPTION OF THE PREFERRED EMBODIMENTS

The present invention relates to carbonate polymer compositions having improved properties such as flame retardancy, and to methods of preparing such improved compositions. More particularly, the compositions of the invention are prepared from a mixture of (A) an organic carbonate polymer or polymer blend, and (B) a minor amount of at least one metal sulfonate which is compatible with the carbonate polymer and which sulfonates are characterized by the formula

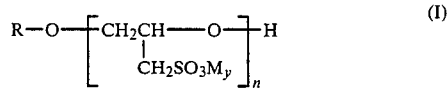

wherein
R is an aliphatic group,
M is an alkali or alkaline earth metal,
n is at least 1, and
y is equal to 1 when M is an alkali metal and ½ when M is an alkaline earth metal.

The polycarbonate resins useful in practice of the invention are produced by reacting phenolic dihydroxy compounds such as di-(monohydroxyaryl)-alkanes or dihydroxybenzenes and substituted dihydroxybenzenes with carbonate precursors such as haloformates; the carbonic acid esters such as carbonic acid diesters; and carbonyl halides such as phosgene. The carbonyl halides which can be employed, are carbonyl bromide, carbonyl chloride and mixtures thereof. Typical of the carbonate esters which can be employed, are diphenyl carbonate, di-(halophenyl)carbonates such as, di-(trichlorophenyl)carbonate, di-(tribromophenyl)carbonate and the like; di-(alkylphenyl)carbonate such as di-(tolyl)carbonate, and the like; di(naphthyl)carbonate, di-(chloronaphthyl)carbonate, phenyl tolyl carbonate, chlorophenyl chloronaphthyl carbonate, and the like, or mixtures thereof. The haloformates suitable for use herein include bishaloformates of dihydric phenols (bis-chloroformates of hydroquinone, and the like) or glycols (bishaloformates of ethylene glycol, neopentyl glycol, polyethylene glycol, and the like). While other carbonate precursors will occur to those skilled in the art, carbonyl chloride, also know as phosgene, is preferred.

The two aryl residues of the di-(monohydroxyaryl)-alkanes used according to the invention can be alike or different. The aryl residues can also carry substituents which are not capable of reacting in the preparation of the polycarbonates, such as halogen atoms or alkyl groups, for example, the methyl, ethyl, propyl or tert-butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2'-(4,4'-dihydroxy-diphenyl)-propane, 1,1-(4,4'-dihydroxydiphenyl)-cyclohexane, 1,1-(4,4'-dihydroxy-3,3'-dimethyldiphenyl)-cyclohexane, 1,1-(2,2'-dihydroxy-4,4'-dimethyldiphenyl)-butane, 2,2-(2,2'-dihydroxy-4,4'-di-tert-butyldiphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°–150° C.), 3,3-(4,4'-dihydroxy-diphenyl)-pentane, 2,2-(4,4'-dihydroxydiphenyl)-hexane, 3,3-(4,4'-dihydroxydiphenyl)-hexane, 3,3-(4,4'-dihydroxydiphenyl)-hexane, 2,2-(4,4'-dihydroxy-diphenyl)-4-methyl-pentane, 2,2-(4,4'-dihydroxy-diphenyl)-4-methyl-pentane, 2,2-(4,4'-dihydroxy-diphenyl)-heptane, 4,4-(4,4'-dihydroxydiphenyl)-heptane (melting point 148°–149° C.) or 2,2-(4,4'-dihydroxy-diphenyl)-tri-decane. Suitable di-(monohydroxyaryl)-alkanes, wherein the two aryl residues are different, include, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxy-aryl)-alkanes, wherein the aryl residues carry halogen atoms are, for example, 2,2-(3,5,3',5'-tetrachloro-4,4'-dihydroxy-diphenyl)-propane, 2,2-(3,5,3',5'-tetrabromo-4,4'-dihydroxydiphenyl)-propane, (3,3'-dichloro-4,4'-dihydroxydiphenyl)-methane and 2,2'-dihydroxy-5,5=-difluorodiphenyl-methane. Suitable di-(monohydroxyaryl)-alkanes in which the alkyl residue of which, linking the two benzene rings is substituted by an aryl residue are for instance (4,4'-dihydroxy-diphenyl)-phenyl-methane and 1,1-(4,4'-dihydroxy-diphenyl)-1-phenyl-ethane.

Suitable dihydroxybenzenes and substituted dihydroxybenzenes are hydroquinone, resorcinol, pyrocatecol, methyl hydroquinone and the like. Other suitable dihydroxyaromatic compounds are 4,4'-dihydroxydiphenylene, 2,2'-dihydroxy-diphenylene, dihydroxynaphthalene, dihydroxyanthracene and compounds represented by the structural formula:

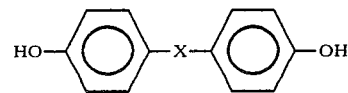

wherein X is S,

In order to obtain special properties, mixtures of various di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'-dihydroxy-diphenyl)-propane]. Thus the flame-retardant characteristics are preferably imparted to the basic polycarbonate resin by a mixture of bisphenol A and tetrabromobisphenol A [2,2-(3,5,3',5'-tetrabromo-4,4'dihydroxy-diphenyl)-propane] reacted with phosgene or a like carbonic acid derivative.

Small amounts of trifunctional or more than trifunctional hydroxy compounds may be reacted in the formation of the polycarbonate resins to branch the polymer chains, preferably of between about 0.05 and 2.0 mol percent (relative to diphenols employed), of trifunctional or more than trifunctional compounds, especially compounds with three or more phenolic hydroxyl groups.

Polycarbonates of this type are described, for example, in German Offenlegungsschriften (German Published Specifications) Nos. 1,570,533; 1,595,762; 2,116,974; and 2,113,347; British Patent Specification 1,079,821 and U.S. Pat. No. 3,544,514 (incorporated herein by reference).

Some examples of compounds with three or more than three phenolic hydroxyl groups which can be used are phloroglucinol; 4,6-dimethyl-2,4,6-tri-(4-hydroxyphenyl) heptane-2,4,6-dimethyl-2,4,6-tri-(4-hydroxyphenyl)-heptane; 1,4,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenylisopropyl)-phenol; 2,6-bis-(2-hydroxy-5'-methylbenzyl)-4-methylphenol; 2-(4-hydroxyphenyl)-2-(2,4-dihydroxyphenyl)-propane; hexa-(4-(4-hydroxyphenylisopropyl)phenyl) ortho-terephthalic acid ester; tetra-(4-hydroxyphenyl)-methane; tetra-(4-(4-hydroxyphenylisopropyl)-phenoxy)-methane; and 1,4-bis-(4',4"-dihydroxytriphenyl)-methyl)-benzene. Some of the other trifunctional compounds are 2,4-dihydroxybenzoic acid, trimesic acid, cyanuric chloride and 3,3-bis(4-hydroxyphenyl)-2-oxo-2,3-dihydroindole.

Preferred polycarbonate resins are those which are thermoplastic and which have a weight average molecular weight from 10,000 to 200,000 and preferably a melt flow rate range of 1 to 24 g/10 min. (ASTM 1238). These can be prepared by methods known to those skilled in the art and more particularly by methods disclosed in U.S. Pat. Nos. 3,028,365; 2,999,846;

3,248,414; 3,153,008; 3,215,668; 3,187,065; 2,964,974; 2,970,137; 2,991,273; and 2,999,835, all incorporated herein by reference. Many of such polycarbonate resins are available commercially.

The carbonate polymer compositions of the invention also may comprise copolymers and blends of carbonate polymers with other resins, and particularly, polyester resins. Polyester-carbonate copolymer compositions, and methods for preparing them are well known in the prior art and these include interfacial polymerization or phase boundary separation, transesterification, solution polymerization, interesterification, etc. Various processes for preparing such copolyester-carbonate compositions are described in U.S. Pat. Nos. 3,030,331; 3,169,121; and 3,207,814. U.S. Pat. No. 4,189,549 describes polyester-carbonate copolymer compositions which are obtained from a melt polymerization process employing para-hydroxy benzoic acid, and U.S. Pat. No. 4,156,069 discloses a process for preparing an alternating ester-carbonate block copolymer from dihydric phenols, dicarboxylic acid, dihalides, phosgene and a molecular weight regulator in the presence of pyridine. The disclosures of the above-identified patents are incorporated herein for their discussion of the methods of preparing the polyester-carbonate copolymers. Although the processes vary, several of the processes typically include dissolving the reactant and a suitable solvent medium under controlled pH conditions and in the presence of a suitable catalyst and acid acceptor, and then contacting these reactants with a carbonate precursor. The molecular weight regulator, that is, a chain stopper, is generally added to the reactants prior to contacting them with a carbonate precursor. The useful molecular weight regulators include monohydric phenols such as phenol.

Techniques for the control of molecular weight are well-known in the prior art and may be used in the present process for controlling the molecular weight of the polyester-carbonate copolymer compositions. In certain preferred embodiments, the number of recurring monomeric units in the polymer chain may be about 50 to about 100 or higher, depending upon the desired properties and use.

The acid acceptor employed can be either an organic or an inorganic acid acceptor. A suitable organic acid acceptor, for example, is a tertiary amine and includes such materials as pyridine, triethylamine, dimethylaniline, tributylamine, and the like. The inorganic acid acceptor, for example, can be one which can be either a hydroxide, a carbonate, a bicarbonate, or a phosphate or an alkali or alkaline earth metal.

The catalysts which can be employed, can be any of the suitable catalysts that aid the polymerization of the diphenol, other dihydric compounds optionally present, and the acid dichloride or dibasic acid with the carbonate precursor. Suitable catalysts include tertiary amines such as triethylamine, tripropylamine, N,N-dimethylaniline, quaternary ammonium compounds such as tetraethylammonium bromide, cetyl triethylammonium bromide, tetra-n-heptylammonium iodide, tetra-n-propylammonium bromide, tetramethylammonium chloride, tetramethylammonium chloride and quaternary phosphonium compounds such as n-butyl-triphenyl phosphonium bromide and methyltriphenyl phosphonium bromide.

The solvent system employed depends upon the reactants (monomers) and the particular mode of polymerization. Generally, the solvent system is one in which the reactants can be accepted but which is inert with respect to the reactants. For example, an aqueous organic solvent system can be employed wherein the organic member can readily accept the reactants, but be inert to them. Exemplary of such organic members are methylene chloride, chlorobenzene, cyclohexanone, carbon tetrachloride, and the like. Preferably, the organic portion of the solvent system is methylene chloride, or it is possible to carry out the polymerization reaction in a solvent which itself is an acid acceptor, such as, pyridine.

Also included herein are branched copolyester-carbonates wherein the polyfunctional aromatic compound is reacted with the dihydric compounds, in the reaction mixture, the carbonate precursor and the polyester precursor, such as the acid dichloride, to provide a thermoplastic randomly branched copolyester-carbonate. These polyfunctional aromatic compounds contain at least three functional groups which are carboxyl, carboxylic anhydride, carboxylic halide or mixtures thereof. Examples of these polyfunctional aromatic compounds include trimellitic anhydride, trimellitic acid, trimellityl chloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Preferred polyfunctional aromatic compounds are trimellitic anhydride or trimellitic acid, or their haloformyl derivatives.

The proportion of carboxylate and carbonate groups present in the polyester-carbonate copolymer compositions which may be used in the present invention is not critical and can be suitably varied by varying the molar ratio of the fluorinated diphenol and/or other dihydric compounds to difunctional polyester precursor, such as difunctional carboxylic acids or difunctional acid halides. In the preparation of the copolyester-carbonates copolymer compositions, the dihydric compounds, the carbonate precursor, and the polyester precursor can be varied depending upon the desired product and depending upon the desired flame rating for the molded products, extruded products, films and other products made from the polyester-carbonate copolymer compositions.

In accordance with the present invention, blends or mixtures of the polyester-carbonate copolymer compositions can also be made with homopolymers, copolymers, mixed homopolymers, mixed copolymers, or mixed homopolymers/copolymers, block copolymers and the like. It is possible to mix or blend the high molecular weight polyester-carbonate copolymer compositions of matter having improved flame resistance with conventional aromatic polycarbonates, with polyarylates, including polyesters, and with conventional copolyester carbonates to obtain improved flame-retardant properties of the conventional resins. The polyester-carbonate copolymers may be blended with linear aromatic polycarbonates, branched aromatic polycarbonates, mixtures of linear and branched aromatic polycarbonates, linear polyesters, branched polyesters, mixtures of linear and branched polyesters, linear polyester-carbonates, branched polyester-carbonates, mixtures of linear and branched polyester-carbonates, and the like.

The metal sulfonates which are included in the carbonate polymer compositions of the invention and which improve the workability and flame-retardancy of the compositions are sulfonates which are compatible with the carbonate polymer. Preferably, the sulfonates are represented by the formula

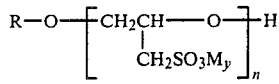

$$\text{R}-\text{O}\underset{\underset{\text{CH}_2\text{SO}_3\text{M}_y}{|}}{-[\text{CH}_2\text{CH}-\text{O}-]_n}\text{H} \qquad (I)$$

wherein R is an aliphatic groups, M is an alkali or alkaline earth metal, n is at least 1, and y is 1 when M is an alkali metal and ½ when M is an alkaline earth metal. Sulfonates of the type represented by Formula I are referred to generally as high molecular alkylglyceryl ether sulfonates. Methods for preparing alkyl glyceryl ether sulfonates of the type represented by Formula I have been described in the prior art. Such compositions where M is an alkali metal, and more particularly where M is sodium are preferred.

One method which has been suggested for preparing compounds of the type represented by Formula I involves the reaction of an excess of epichlorohydrin with a high molecular weight alcohol whereby alkyl polychloroglyceryl ethers are formed along with alkyl monochloroglyceryl ethers. Sulfonates are formed from these ethers through the normal Streckerization reaction, that is, by treatment with an alkali metal sulfite. Alternatively, the sulfonate can be prepared by reacting the halo ether with a combination of alkali metal sulfite and bisulfite. Examples of prior art patents describing methods of preparing sulfonates of the type represented by Formula I include U.S. Pat. Nos. 2,094,489 and 2,989,547.

The metal sulfonates represented by Formula I can be prepared by the alkoxylation of mono-hydroxy- or poly-hydroxy-alkyl sulfonic acids with higher molecular weight fatty alcohols, e.g., by the alkoxylation of hydroxy-ethane-sulfonic acid or di-hydroxy propane sulfonic acid. In accordance with the preferred procedure, one or more fatty alcohols having from about 8 to 24 carbon atoms are reacted with an equal molar amount of epichlorohydrin or propylene oxide, or an excess of said epichlorohydrin or propylene oxide (in an amount sufficient to provide the product having the desired n value in Formula I) in the presence of a suitable catalyst. If propylene oxide is utilized as the ractant, the hydroxyl group which is formed is converted to a halide by reaction with hydrogen halide and the halogen is then replaced by the sulfonic acid group. When epichlorohydrin is utilized as the reactant with the fatty alcohol mixtures, a chlorine atom is present in the intermediate product. In either procedure, the chlorine atom then is replaced by the desired sulfonic acid group by reaction with sulfuric acid and a slight excess of sodium sulfite, generally in an autoclave. This latter procedure for introducing sulfonic acid groups is known as the Streckerization reaction.

The sulfonates of the type represented by Formula I which are useful in this invention are those which are compatible with the carbonate polymers. Thus, the nature of the R groups and M metal, as well as the value of n are selected and may be varied to achieve the desired compatibility. Generally, the R group will contain from about 8 to 24, and preferably from about 10 to 24 carbon atoms, M will be an alkali metal, and n will be from about 1 to 4. Mixtures of alkali metal sulfonates wherein the average of n is from about 1 to 2 are particularly useful.

In one embodiment, the fatty alcohols which are useful in the preparation of the sulfonates of the invention are the aliphatic alcohols with at least 8 carbon atoms in the molecule and naphthenic alcohols. Examples of suitable aliphatic alcohols include octyl-, decyl-, dodecyl-, myristyl- and cetyl alcohol, and the alcohol mixtures obtained by high pressure reduction from natural greases such as cocoa fat, tallow, and palm kernel oil. Oxo alcohols also can be used in the preparation of the metal sulfonates of the invention. Mixtures of fatty alcohols derived from various natural oils such as coconut oil are useful. An example of such a mixture is the "middle cut" of the fatty alcohol derived from coconut oil which contains largely $C_{12}$ and $C_{14}$ fatty alcohols.

Unsaturated alcohols such as oleyl alcohol and its homologs can be utilized, as well as polyhydroxy saturated or unsaturated alcohols such as hydroxy stearyl alcohol or ricinoleyl alcohol obtained by reducing castor oil. Accordingly, when the terms aliphatic or alkyl are utilized in describing the metal sulfonates, the terms are understood to include within their scope the alkenyls aas well as the true alkyls.

It should also be understood that although in the foregoing discussion, only sodium sulfite and sodium bisulfite had been discussed in conjunction with the Streckerizing and/or sulfonating agents, other alkali metal sulfites, such as potassium sulfite and bisulfite also can be utilized to prepare the metal sulfonates of the invention. Furthermore, when it is desired to have salts other than sodium or potassium salts such as, for example, the alkaline arth metal salts including calcium and magnesium, the sodium salt, for example, can be passed over an ion exchange resin to replace sodium ion with a hydrogen ion, and the resulting acid neutralized with calcium or magnesium hydroxide.

The carbonate polymer and metal sulfonates can be blended together in amounts varying over rather wide ranges. In general, the amount of metal sulfonate blended with the polycarbonate can be any amount which is sufficient to provide the blended mixture with the desired characteristics such as workability and/or flame retardancy. Preferably, the compositions of the invention will comprise up to about 10% by weight of the metal sulfonate, and more preferably, from about 0.001 to about 2 or even 7% by weight of the sulfonate, based on the weight of the polycarbonate.

The polycarbonate compositions of this invention are prepared by admixing the aromatic carbonate polymer with the metallic salts. The metallic salts may be admixed with the polycarbonate in a finely divided solid form or they may be admixed in the form of a solution or dispersion. Preferably, the salts are admixed with the polycarbonate in the form of an aqueous solution or dispersion. The blending of the polycarbonate and metal sulfonate can be effected by any of the conventional means, such as tumblers, dough mixers, roll mixers, or Banbury mixers; by extrusion; or by fluxing the solid polymers. When desired, solution or dispersion mixing can be used by proper selection of solvents and diluents. Mixing and blending of the polycarbonate compositions and the metallic salts (with or without other additives as described more fully below) can be effected at temperatures of from room temperature up to and above the melting point of the polycarbonate.

When a two-roll mill or a Banbury mixer is employed, blending can easily be effected at about or above the melting point of the polymer. The temperature selected should not be so high as to result in degradation of the polycarbonate or of the metal sulfonate.

The polycarbonate composition of the instant invention may also contain fillers, pigments, dyes, antioxidants, stabilizers, ultraviolet light absorbers, mold release agents and other additives commonly employed in polycarbonate resin formulations.

The ultraviolet light absorber functions by reason of its ability to screen out the damaging ultraviolet portion of light due to its very high absorptivity relative to that of the polymer. Two types of organic compound found to fulfill these conditions are the benzotriazoles. Within these groups the members thereof exhibit a variety of usefulness and it is much preferred that either 2,2'-dihydroxy-4,4'dimethoxy benzophenone or 2-(2'-hydroxy 5'-methylphenol) benzotriazole be used in carrying out the invention herein.

Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium oxide and the like.

The compositions of the present invention may be formed by any method commonly known to the art. For instance, the various additives may be dry blended with polycarbonate pellets and the mixture extruded. Alternatively, the additives may be metered to a devolatilizing extruder as the polymer is being recovered from solution. Of course, those additives which are soluble in polycarbonate process solvents may be added to a solution of polycarbonate and those which are soluble in polycarbonate may be added to its melt. The only requirements are that the additives be thoroughly distributed.

The polycarbonate compositions of this invention are readily extruded by conventional procedures to produce rods, films, and protective coatings. The products so otained are clear, tough compositions.

The polycarbonate compositions of the invention containing the above-identified sulfonates exhibit improved flame-retardancy characteristics. It also has been observed that the sulfonates act as plasticizers resulting in polycarbonate compositions having reduced melt viscosity, and the compositions do not become brittle or degraded upon molding. Thus, the products retain the high characteristic impact strength of the polycarbonates.

The following examples illustrate the preparation of the polycarbonate compositions of the invention. Unless otherwise indicated, in the following examples and throughout this application, all parts and percentages are by weight.

EXAMPLE 1

A polycarbonate blend is prepared by incorporating about 0.9 parts of a sodium sulfonate mixture characterized by the formula

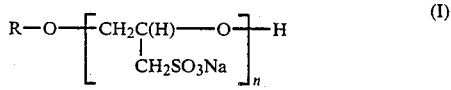

(I)

wherein R is a mixture of aliphatic groups containing 12 to 14 carbon atoms and 16 to 18 carbon atoms, and the average of n is about 1.5. The sodium sulfonate is dispersed in about 100 parts water and the dispersion is thoroughly mixed with 454 parts of a polycarbonate resin available from Dow Chemical Company. The coated polycarbonate is dried with occasional stirring in a forced air oven at about 90° C. and for 1.5 hours at 130° C.

The polycarbonate blend (135 parts) is passed through a Brabender extruder with the barrel temperature zones set at a temperature of about 305° C. and the ribbon die temperature at 284° C. at 16.

The maximum and equilibrium torque values were 500 meter-grams. When a control sample of the same polycarbonate is passed through the extruder under essentially the same conditions, the maximum torque value is 7000 meter-grams, and the equilibrium torque value appears to be around 6000 meter-grams. When the polycarbonate blend containing the additive is passed through the Brabender extruder under the above conditions, but at 50 rpm, the maximum torque is 3100 meter-grams and the equilibrium torque is approximately 2700 meter-grams. Ribbons, ¾-inch to 1-inch wide are formed in this manner, and disks can be molded from these samples.

EXAMPLE 2

The polycarbonate resin utilized in Example 1 (51 parts) is blended with about 0.05 parts by weight of two different sodium sulfonate mixtures having the formula specified in Example 1 above. In one mixture, the R groups comprise a mixture of aliphatic groups containing 12 to 14 carbon atoms, and in the second sulfonate mixture, the R groups comprise a mixture of 12 to 14 carbon atoms and 16 to 18 carbon atoms. Each blended polycarbonate mixture is poured into a Brabender Plasti-corder mixer maintained at a temperature of about 300° C. and at 50 rpm. Samples are mixed for ten minutes and removed. The maximum and equilibrium torques observed for these samples, as well as a controlled polycarbonate sample containing no sulfonate additive are summarized in the following Table I.

TABLE I

| Sample | Maximum Torque (Meter-Gram) | Equilibrium Torque (Meter-Gram) |
|---|---|---|
| Control | 6000 | 500 |
| Sulfonate Mixture 1 | 1400 | 490 |
| Sulfonate Mixture 2 | 1950 | 490 |

The samples prepared in this manner are clear with some yellow color.

EXAMPLE 3

Three blends of the polycarbonate and the sodium sulfonate mixture described in Example 1 are prepared containing different amounts of the sulfonate mixture by mixing in a Brabender Plasti-corder mixer at 300° C., at 50 rpm and for a period of ten minutes. The addition time and torque values are summarized in the following Table II.

TABLE II

| Sample | Addition Time (Sec.) | Maximum Torque (Meter-Gram) | Equilibrium Torque (Meter-Gram) |
|---|---|---|---|
| A-0.1% Sulfonate | 30 | 2350 | 1500 |
| B-0.2% Sulfonate | 30 | 2100 | 1500 |
| C-0.4% Sulfonate | 65 | 1000/1300 | 1500 |

Two disks are molded from each of the mixed samples as well as a control polycarbonate containing no sulfonate additive. A portion of each disk (10 grams) is placed in a cylindrical mold on a press for five minutes, 245° C. with an initial pressure of eight tons ram-force. The disks are then cooled on a different press under initial pressure of five tons ram-force. From each disk so molded, two 0.5-inch wide strips are cut from the center, and the end of each sample strip is held in a Bunson burner flame for 20 seconds and removed. The unburned end of each sample is then subjected to the same flame test. The results obtained from this test are summarized in the following Table III.

TABLE III

| Sample No. | Burning Time After Removal of Flame (Sec) | Reason for End of Burning |
|---|---|---|
| Control 1 | 4 | Self-extinguished |
|  | 23 | Burning part dropped off |
| Control 2 | 39 | Self-extinguished |
|  | 42 | Burning part dropped off |
| Control 3 | 16 | Burning part dropped off |
|  | 28 | Burning part dropped off |
| Control 4 | 19 | Burning part dropped off |
|  | 17 | Self-extinguished |
| A-1 | 5 | Self-extinguished |
| A-1 | 4 | Self-extinguished |
| A-2 | 2.5 | Self-extinguished |
| A-2 | 2 | Self-extinguished |
| A-3 | 2 | Self-extinguished |
| A-3 | 2 | Self-extinguished |
| A-4 | 5 | Self-extinguished |
| A-4 | 4 | Self-extinguished |
| B-1 | 3 | Self-extinguished |
| B-1 | 1.5 | Self-extinguished |
| B-2 | 3 | Self-extinguished |
| B-3 | 2 | Self-extinguished |
| B-3 | 2 | Self-extinguished |
| B-4 | 3 | Self-extinguished |
| B-4 | 2 | Self-extinguished |
| C-1 | 3 | Self-extinguished |
| C-1 | 1 | Self-extinguished |
| C-2 | 6 | Self-extinguished |
| C-2 | 5 | Self-extinguished |
| C-3 | 8 | Self-extinguished |
| C-3 | 9 | Self-extinguished |
| C-4 | 4 | Self-extinguished |
| C-4 | 3 | Self-extinguished |

I claim:

1. A carbonate polymer composition comprising a mixture of
   (A) an aromatic organic carbonate polymer, and
   (B) at least about 0.001% by weight of at least one metal sulfonate which is compatible with the aromatic carbonate polymer and which sulfonates are characterized by the formula

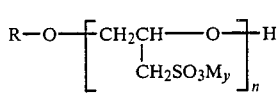
(I)

wherein
   R is an aliphatic group containing up to about 24 carbon atoms,
   M is an alkali or alkaline earth metal,
   'n is a number from 1 up to and including 4
   Y is equal to 1 when M is an alkali metal and ½ when M is an alkaline earth metal.

2. The carbonate composition of claim 1 wherein R is an aliphatic group containing at least about 8 carbon atoms.

3. The carbonate composition of claim 1 wherein n is from about 1 to about 2.

4. The carbonate composition of claim 1 wherein R is an aliphatic group containing from about 10 to 24 carbon atoms.

5. The carbonate composition of claim 1 wherein the mixture contains up to about 10% by weight of the sulfonate.

6. The carbonate composition of claim 1 containing from about 0.001 to 2% by weight of the metal sulfonate.

7. The carbonate composition of claim 1 wherein M is an alkali metal.

8. The carbonate composition of claim 1 wherein the sulfonate comprises a mixture of sulfonates of Formula I wherein the average of n is from 1 to about 2.

9. The carbonate composition of claim 1 containing from about 0.1 to about 10% by weight of the metal sulfonate.

10. A carbonate composition comprising a blend of (A) an aromatic carbonate polymer and (B) from about 0.01 to about 10% by weight of at least one metal sulfonate of the formula

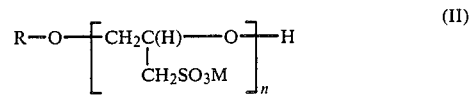
(II)

wherein R is an aliphatic group containing from about 10 to 24 carbon atoms, M is an alkali metal, and n is from 1 to about 4.

11. The carbonate composition of claim 10 wherein the sulfonate comprises a mixture wherein R contains from about 12 to 18 carbon atoms.

12. The carbonate composition of claim 10 wherein the alkali metal is sodium or potassium.

13. The carbonate composition of claim 10 wherein the sulfonate comprises a mixture of sulfonates wherein the average of n is from 1 to about 2.

14. The carbonate composition of claim 10 wherein the sulfonate is prsent in an amount of from about 0.001 to 2% by weight based on the weight of the carbonate polymer.

15. A process for improving the processability and flame retardancy characteristic of aromatic polycarbonates which comprises including in the polycarbonate at least about 0.001% up to about 10% based on the weight of the polycarbonate, of at least one metal sulfonate which is compatible with the polycarbonate and which sulfonates are characterized by the formula:

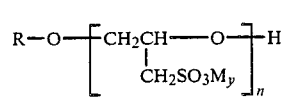
(I)

wherein
   R is an aliphatic group containing up to about 24 carbon atoms,
   M is an alkali or alkaline earth metal,
   'n is a number from 1 up to and including 4
   y is equal to 1 when M is an alkali metal and ½ when M is an alkaline earth metal.

16. The process of claim 15 wherein the sulfonate is a mixture of sulfonates represented by Formula I, and M is an alkali metal.

17. The process of claim 16 wherein the average of n is from 1 to about 2 and the alkali metal is sodium or potassium.

18. The process of claim 15 wherein from about 0.001 to 2% by weight of the metal sulfonate is included in the polycarbonate.

19. The process of claim 15 wherein R is an aliphatic group containing at least about 8 carbon atoms.

20. The process of claim 18 wherein R is an aliphatic group containing from about 10 to 24 carbon atoms.

21. The process of claim 15 wherein the sulfonate is a mixture of sulfonates wherein R is from about 12 to 18 carbon atoms.

* * * * *